US012490028B2

(12) United States Patent
Wilson et al.

(10) Patent No.: US 12,490,028 B2
(45) Date of Patent: Dec. 2, 2025

(54) BINAURAL HEARING SYSTEM AND METHOD FOR OPERATING A BINAURAL HEARING SYSTEM

(71) Applicant: Sivantos Pte. Ltd., Singapore (SG)

(72) Inventors: Cecil Wilson, Erlangen (DE); Jurek Föllmer, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 358 days.

(21) Appl. No.: 18/184,068

(22) Filed: Mar. 15, 2023

(65) Prior Publication Data

US 2023/0300543 A1 Sep. 21, 2023

(30) Foreign Application Priority Data

Mar. 17, 2022 (DE) ..................... 10 2022 202 646.2

(51) Int. Cl.
*H04R 25/00* (2006.01)

(52) U.S. Cl.
CPC ........... *H04R 25/43* (2013.01); *H04R 25/407* (2013.01); *H04R 25/50* (2013.01); *H04R 25/552* (2013.01)

(58) Field of Classification Search
CPC ...... H04R 28/43; H04R 25/407; H04R 25/50; H04R 25/552
USPC ........................................................... 381/60
See application file for complete search history.

(56) References Cited

U.S. PATENT DOCUMENTS

| | | | | |
|---|---|---|---|---|
| 3,509,289 A | | 4/1970 | Briskey et al. | |
| 5,825,894 A | * | 10/1998 | Shennib ................. | H04R 25/70 381/60 |
| 6,549,633 B1 | | 4/2003 | Westermann | |
| 10,805,740 B1 | * | 10/2020 | Snyder ................. | H04R 25/407 |

(Continued)

FOREIGN PATENT DOCUMENTS

| | | | |
|---|---|---|---|
| DE | 69838989 | T2 | 5/2008 |
| DE | 102007008738 | A1 | 8/2008 |

(Continued)

OTHER PUBLICATIONS

Dwyer Robert T. et al, "Synchronized Automatic gain Control in Bilateral Cochlear Implant Recipients Yields Significant Benefit in Static and Dynamic Listening Conditions", Trends in Hearing, Bd. 25, May 24, 2021 (May 24, 2021), XP093034624, ISSN: 2331-2165, DOI: 10.1177/23312165211014139.

*Primary Examiner* — Suhan Ni
(74) *Attorney, Agent, or Firm* — Laurence A. Greenberg; Werner H. Stemer; Ralph E. Locher

(57) ABSTRACT

A method for operating a binaural hearing system having first and second hearing instruments includes using respective electroacoustic first and second input transducers of the first and second hearing instruments to generate first and second input signals from ambient sound. The first and second input signals are used to ascertain respective first and second instantaneous gain parameters. A first parameter of an automatic gain control for the first input signal and/or a second parameter of an automatic gain control for the second input signal is/are adjusted so that the adjustment results in a difference between the first and second instantaneous gain parameters being decreased. Signal processing for the first or second input signal using the thus adjusted first or second parameter of the automatic gain control is (Continued)

performed in the first or second hearing instrument. A binaural hearing system is also provided.

19 Claims, 2 Drawing Sheets

(56) References Cited

U.S. PATENT DOCUMENTS

| | | | |
|---|---|---|---|
| 11,438,707 | B2 | 9/2022 | Best et al. |
| 2006/0239468 | A1* | 10/2006 | Desloge ................. H04R 25/30 381/60 |
| 2008/0205659 | A1 | 8/2008 | Fischer et al. |
| 2011/0249823 | A1 | 10/2011 | Thomsen et al. |
| 2015/0110315 | A1* | 4/2015 | Callias ................. H04R 25/554 381/315 |
| 2018/0014133 | A1* | 1/2018 | Hamacher ................. A61F 2/18 |
| 2018/0091907 | A1 | 3/2018 | Long et al. |

FOREIGN PATENT DOCUMENTS

| | | | |
|---|---|---|---|
| DE | 102018207343 | A1 | 11/2019 |
| WO | 2016180462 | A1 | 11/2016 |
| WO | 2018038821 | A1 | 3/2018 |

* cited by examiner

BINAURAL HEARING SYSTEM AND METHOD FOR OPERATING A BINAURAL HEARING SYSTEM

CROSS-REFERENCE TO RELATED APPLICATION

This application claims the priority, under 35 U.S.C. § 119, of German Patent Application DE 10 2022 202 646.2, filed Mar. 17, 2022; the prior application is herewith incorporated by reference in its entirety.

FIELD AND BACKGROUND OF THE INVENTION

The invention relates to a method for operating a binaural hearing system having a first hearing instrument and a second hearing instrument, wherein an electroacoustic first input transducer of the first hearing instrument generates a first input signal, and an electroacoustic second input transducer of the second hearing instrument generates a second input signal, from ambient sound, the first input signal is used to ascertain a first instantaneous gain parameter, and the second input signal is used to ascertain a second instantaneous gain parameter.

In a hearing instrument, ambient sound is converted by at least one electroacoustic input transducer (such as e.g. a microphone) into an input signal, which is processed frequency band by frequency band and also amplified in the process. That can be performed e.g. in a hearing device "in the narrower sense" in order to correct a hearing loss of a wearer, by matching the frequency-band-by-frequency-band processing of the input signal individually to the audiological requirements of the wearer. Other hearing instruments can also have those functions, however, in order to assist the wearer in everyday life.

The processed input signal is converted by way of an output transducer of the hearing instrument into an output sound signal, which is routed to the hearing of the wearer. During the signal processing, an automatic volume control ("automatic gain control," AGC) and also a dynamic compression are often applied to the input signal or to an already preprocessed intermediate signal, the control/compression resulting in the input signal being linearly amplified, usually only up to a certain limit value, and a lower gain being applied above the limit value in order to thereby even out level peaks in the input signal. That is intended in particular to prevent sudden, loud sound events from leading to an output sound signal that is too loud for the wearer as a result of the additional gain in the hearing device.

In the case of a binaural hearing system having two individual hearing instruments (to be worn on the left and right ears), however, the compression in the individual hearing instruments results in a sound signal from a sound source that is slightly to the side being amplified to different degrees. In particular, noise in the respective half-area (that is to say to the right or left) can also result in the local input signal of the respective hearing instrument being compressed by the AGC to a greater degree and therefore amplified less. That can lead to a loss of the natural interaural level differences that are required for correctly locating sound sources. As a result, the wearer of the binaural hearing system may thus acoustically perceive a sound source to be at a different location than the one at which the wearer sees the source.

SUMMARY OF THE INVENTION

It is accordingly an object of the invention to provide a binaural hearing system and a method for operating a binaural hearing system, which overcome the hereinafore-mentioned disadvantages of the heretofore-known systems and methods of this general type and which provide signal processing in a binaural hearing system that, in particular in conjunction with AGC and dynamic compression, facilitates correct acoustic location of sound sources.

With the foregoing and other objects in view there is provided, in accordance with the invention, a method for operating a binaural hearing system having a first hearing instrument and a second hearing instrument, wherein an electroacoustic first input transducer of the first hearing instrument generates a first input signal, and an electroacoustic second input transducer of the second hearing instrument generates a second input signal, from ambient sound, the first input signal is used to ascertain a first instantaneous gain parameter, and the second input signal is used to ascertain a second instantaneous gain parameter.

In accordance with the method, there is provision for a first parameter of an AGC for the first input signal and/or a second parameter of an AGC for the second input signal to be adjusted so that the adjustment results in a difference between the first and the second instantaneous gain parameter being decreased, and for a signal processing for the first or second input signal using the thus adjusted first or second parameter of the AGC to be performed in the first or second hearing instrument. Refinements that are advantageous, and in some cases inventive in themselves, are the subject matter of the subclaims and the description that follows.

When the binaural hearing system is operated as intended, the first and the second hearing instrument are intended to be worn by the wearer on the left and right ears (without this resulting in the first or second hearing instrument being necessarily assigned to a particular ear).

A hearing instrument in this instance generally includes any apparatus that is configured to generate an electrical input signal from ambient sound, and to use appropriate processing to generate an output signal therefrom, which is in turn converted by an output transducer into an output sound signal. The output sound signal is supplied to the hearing of the wearer of this apparatus. In particular, a hearing instrument is defined as headphones (e.g. in the form of an "earplug"), a headset, smart glasses with a loudspeaker, etc. However, a hearing instrument also includes a hearing device in the narrower sense, that is to say a device for catering for a hearing loss of the wearer, in which an input signal generated from a surroundings signal by using a microphone is processed to produce an output signal and, during the processing, is amplified, in particular according to frequency band, and an output sound signal generated from the output signal by using a loudspeaker or the like is suitable for at least partly compensating for the hearing loss of the wearer, in particular on a user-specific basis.

An electroacoustic input transducer in this instance includes in particular a transducer that is configured to generate a corresponding electrical signal from the ambient sound. In particular, the generation of the first or second input signal by the respective input transducer can also result in a preprocessing being performed, e.g. in the form of a linear preamplification and/or an A/D conversion. The accordingly generated input signal is provided in particular by an electrical signal, the current and/or voltage variations in which substantially represent the sound pressure variations in the air.

The first and the second instantaneous gain parameters should preferably be ascertained in such a way that level peaks in the ambient sound are attenuated in the respective first or second input signal, and this in particular prevents overdriving, and particularly preferably lifts quiet sound events in the ambient sound. In particular, the instantaneous gain parameters can be ascertained on the basis of an AGC, for example by using an appropriate compression characteristic curve.

The first and the second parameters of the AGC that are to be adjusted can be provided directly by the first and second instantaneous gain parameters; in this case, the difference can be decreased directly by the adjustment, e.g. by bringing the instantaneous gain parameters into line with one another.

The first and second parameters of the AGC that are adjusted can also be a compression ratio, a knee of a compression characteristic curve, an attack time and/or a release time of a compression, however. In this case, the effect of the adjustment is preferably that a recalculation of the instantaneous gain parameters on the basis of the input signals processed using the adjusted AGC results in there being a smaller difference between the instantaneous gain parameters. This encompasses in particular the fact that natural volume differences in the ambient sound on the two sides of the binaural hearing system, which are represented accordingly in the two input signals, are preserved to a greater degree. In particular, just the first parameter of the AGC can be adjusted, or else the first and the second parameter of the AGC can be adjusted, specifically in the latter case preferably by "moving" the two parameters toward one another.

The adjustment to the first or second parameter of the AGC can be made in particular by transmitting the input signal of the respective other hearing instrument—or a transmission signal derived therefrom (which may have a lower sample rate and/or a smaller dynamic range than the input signal in question and/or may contain only some frequency bands of the input signal)—to the "local" hearing instrument, and ascertaining both instantaneous gain parameters and accordingly the adjustment to the relevant parameter of the AGC (or to both parameters) in a hearing instrument on the basis of both input signals—that is to say the "local" input signal and the "remote" input signal (of the other hearing instrument).

However, the adjustment to the first or second parameter of the AGC can also be made by ascertaining the respective instantaneous gain parameter locally in each hearing instrument on the basis of the local input signal, and transmitting only this instantaneous gain parameter to the respective other hearing instrument, then making the adjustment to the local parameter of the AGC on the basis of both instantaneous gain parameters in at least one of the hearing instruments.

The adjustment to the first or second parameter of the AGC is made in the respective hearing instrument in question, preferably on the basis of rules previously stipulated for both hearing instruments identically, that is to say in particular on the basis of the two instantaneous gain parameters and possibly other variables, the rule having previously stipulated the manner in which the respective parameter of the AGC is to be adjusted in which of the hearing instruments, and how (that is to say e.g. by lowering or raising it).

The effect achieved by the adjustment to either the first or the second parameter of the AGC or to both parameters is that natural volume differences in the ambient sound are better preserved. This can be accomplished e.g. by aligning the two parameters with one another, in particular in the case of a level-related parameter of the AGC such as a compression ratio or an instantaneous gain parameter (or a knee of the compression characteristic curve). This circumstance translates into the difference between the instantaneous gain parameters decreasing—when they are recalculated on the basis of the input signals processed using the adjusted parameters of the AGC. This decreased difference between the volumes then permits distinctly improved acoustic location of sound sources on the basis of output signals that have each been generated from the respective input signal in the hearing instrument in question on the basis of the adjusted parameters of the AGC, since the different compression that distorts interaural level differences can be removed at least in part.

It is found to be advantageous if the first input signal and the second input signal are used to at least approximately determine a direction of a sound source relating to the ambient sound, and the adjustment to the first or second parameter of the AGC is also made on the basis of the ascertained direction of the sound source. It is possible e.g. to determine the direction of the sound source to within an accuracy of a few degrees (e.g. +/−5° or +/−10°) in this instance, and the adjustment to the respective parameter of the AGC, for which there is provision, or which is deemed necessary, on the basis of the two instantaneous gain parameters, can turn out to a greater degree the closer the sound source is to a frontal direction of the wearer (the frontal direction lies in the plane of symmetry between the two hearing instruments when the binaural hearing system is used as intended). The farther the sound source is in the lateral direction, the more easily it can be located on the basis of the interaural level differences, and so the adjustment to the AGC on both sides can be attenuated in favor of a softer sound if necessary.

The determination of the direction of the sound source may preferably be linked to an analysis with respect to a useful sound signal, i.e. in particular in a situation with multiple sound sources (some of which may be directional) an analysis can be performed to ascertain which sound signal among the individual sound sources can be regarded as a useful sound signal (for example a voice signal), with the result that the direction of the sound source for this useful sound signal is approximately determined. The useful sound signal can be identified in particular on the basis of an analysis of a modulation and/or an analysis of spectral contributions by the first and/or the second input signal.

The approximate determination of the direction of the sound source advantageously involves ascertaining a focus half-area, containing the sound source, and a background half-area, which is remote from the focus half-area, the focus half-area and the background half-area being defined relative to the plane of symmetry of the binaural hearing system (during operation as intended), and the adjustment to the first or second parameter of the AGC involving in particular also using the applicable first or second instantaneous gain parameter relating to the focus half-area and/or a signal level in the focus half-area.

In other words, the direction of the sound source is determined only with respect to the lateral half-area in which the sound source is located. The two half-areas are defined relative to the plane of symmetry of the hearing instruments (as worn during operation as intended), the half-area of the sound source being referred to as the focus half-area, and the remaining half-area being referred to as the background half-area. The adjustment to the first or second parameter of the AGC, and thus the adjustment to the signal processing of the dynamic range in the two hearing instruments, is then made on the basis of the signal level and/or on the basis of the instantaneous gain parameter in the half-area in which the sound source is located (that is to say in the focus half-area). If the sound level in the focus half-area is higher than the sound level in the background half-area, this can be used to stipulate for example the manner in which gain parameters can be raised even further, or whether in particular the instantaneous gain parameter relating to the focus half-area (or a compression ratio there) needs to be raised for the adjustment.

In one advantageous refinement, the adjustment to the first or second parameter of the automatic gain control involves ascertaining a first correction parameter and/or a second correction parameter, wherein an adjusted first or second parameter is formed on the basis of a convex combination of the first parameter with the first correction parameter, or of the second parameter with the second correction parameter, respectively. The first correction parameter or the second correction parameter preferably corresponds to a complete "unilateral" adjustment to the respective parameter, i.e. a parameter value that the first parameter should preferably assume in order to bring about an adjustment to the signal processing with respect to preserving the interaural level differences merely by way of the first parameter is ascertained for example for the first parameter of the AGC, on the basis of the two instantaneous gain parameters and possibly a direction of a sound source and/or a signal level (see above). This parameter value, the first correction parameter PC1, can then either be used directly for the signal processing or can be convexly combined with the original value P1 of the first parameter (which has been stipulated in accordance with the first instantaneous gain parameter), in order to obtain the parameter value Pout1 of the first parameter that is ultimately used in the signal processing, that is to say (*i*) $\mathrm{Pout1}=w1\cdot PC1+(1-w1)\cdot P1$ with $0\leq w1\leq 1$.

A comparable process can in particular also be performed for the second parameter, that is to say (*i'*) $\mathrm{Pout2}=w2\cdot PC1+(1-w2)\cdot P2$ with $0\leq w2\leq 1$, the second correction parameter PC2, the original value of the second parameter P2, and the finally used value Pout2 of the second parameter.

On one hand, the "continuous" variation of the adjustment that is described herein can be performed for each hearing instrument independently. This can advantageously also be performed on the additional basis of an ascertained voice content in the input signals. If a high proportion of voice is ascertained in one of the input signals, then a high level of modification of the first (and possibly the second) parameter can be performed for the adjustment (w1, and possibly w2, is then chosen to be close to 1), since locating the voice source is deemed important.

On the other hand, in particular as a result of a functional combination of the weighting factors w1, w2, it is also possible to make a connection between the adjustments on both sides, that is to say as w2=f(w1), in particular w2=1−w1. In this case, an adjustment to the parameter on one side is made to a greater degree the smaller the degree to which it is made on the other side.

This approach is advantageous in particular in combination with the ascertainment of the focus and background half-areas (and the corresponding signal level relating to the focus half-area), since the total extent of the adjustment can be distributed over the two sides on the basis of the signal volume in the focus half-area.

The first input signal or a first transmission signal derived therefrom is advantageously transmitted from the first hearing instrument to the second hearing instrument, wherein the first and the second instantaneous gain parameter are ascertained locally in the second hearing instrument, and wherein the first and the second instantaneous gain parameter are taken as a basis for adjusting the second parameter of the automatic gain control for the signal processing of the second input signal in the second hearing instrument. This approach is particularly advantageous if not only the two instantaneous gain parameters but also for example the direction of a sound source are to be used for the adjustment.

The second input signal or a second transmission signal derived therefrom is preferably also transmitted from the second hearing instrument to the first hearing instrument, wherein the two instantaneous gain parameters are ascertained locally in the first hearing instrument, and wherein the two instantaneous gain parameters are taken as a basis for adjusting the first parameter of the automatic gain control for the signal processing of the first input signal in the first hearing instrument.

The local ascertainment of the first and the second instantaneous gain parameter in the second (or in the first) hearing instrument advantageously involves using a respective specifically dedicated hardwired circuit. This means in particular that the first instantaneous gain parameter is ascertained on a specifically assigned hardware circuit (e.g. an ASIC) of the hearing instrument in question, and the second instantaneous gain parameter is ascertained on a further hardware circuit of the same hearing instrument. Some hearing instruments themselves already have two such specifically dedicated circuits, one circuit being intended for an AGC of the audio signals generated in the hearing instrument and the other circuit being intended for an AGC of a streaming signal that the hearing instrument receives e.g. from a multimedia device, or from a telephone or the like. In this case, for example an AGC ASIC in the second hearing instrument originally intended for the streaming signal can be used to ascertain the first instantaneous gain parameter.

The method is preferably applied frequency band by frequency band, i.e. the AGC in each hearing instrument is performed separately for each frequency band, and accordingly the adjustment to the relevant first or second parameter of the AGC in accordance with the method is also made separately for individual frequency bands. However, the adjustment can in this case also be restricted to individual frequency bands or in particular also to a contiguous frequency range (which is particularly important for example for the interaural level differences for location) including multiple frequency bands. This also permits energy-efficient implementation of the method (in particular with respect to battery power). In this case, the first transmission signal transmitted to the second hearing instrument is preferably only low frequency bands (in the frequency range) of the first input signal, which improves the energy efficiency further.

With the objects of the invention in view, there is concomitantly provided a binaural hearing system having a first hearing instrument and a second hearing instrument, wherein the binaural hearing system is configured to carry out the method described above. The binaural hearing system according to the invention shares the benefits of the method according to the invention. The advantages indicated for the method and for its developments can be transferred, mutatis mutandis, to the binaural hearing system.

In order to carry out the method, the first and the second hearing instrument preferably each include a first or second input transducer for generating the first and second input signals of the method. The binaural hearing system preferably includes, in at least one of the hearing instruments, a signal processing unit for performing the signal processing steps of the method, which unit in particular includes at least one signal processor. Both hearing instruments particularly preferably each include such a signal processing unit.

Other features which are considered as characteristic for the invention are set forth in the appended claims.

Although the invention is illustrated and described herein as embodied in a binaural hearing system and a method for operating a binaural hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now in detail to the figures of the drawings, in which mutually corresponding parts and variables are each provided with the same reference signs, and first, particularly, to FIG. 1 thereof, there is seen a plan view diagrammatically showing a conversation situation in which a first person 1 is conversing with a second person 2 who is in front of the first person 1 (and is facing him or her). Diagonally behind the first person 1 is also a third person 3, who may also express or interject things, but is not taking part in the conversation between the first person 1 and the second person 2. For the explanations that follow, the third person 3 could also be replaced by another directional noise source of any kind whatsoever.

Figure 1B:
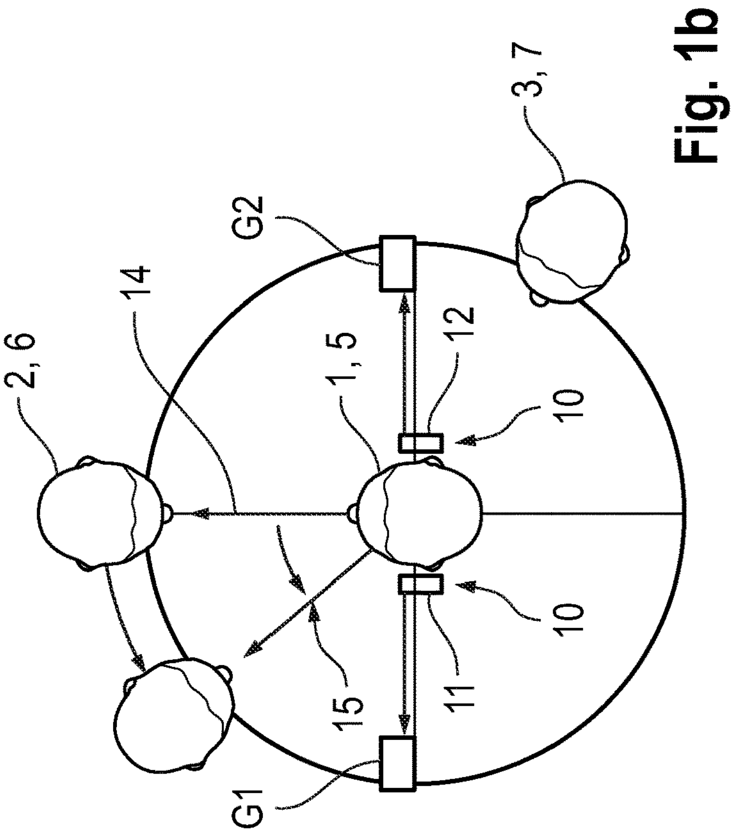
FIG. 1*b* is a plan view showing the effect of dynamic compression in the binaural hearing system on the spatial auditory perception of the conversation situation shown in FIG. 1*a* by the wearer.
Figure 1A:
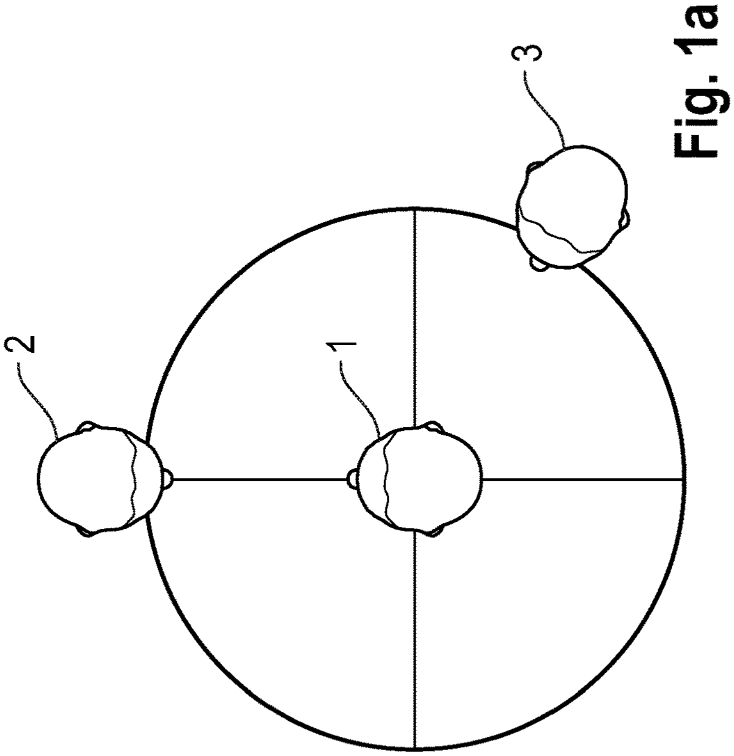
FIG. 1*a* is a diagrammatic, plan view showing a conversation situation.

FIG. 1*b* uses a plan view to diagrammatically show the conversation situation shown in FIG. 1*a*. In this case, the first person 1 is provided by a wearer 5 of a binaural hearing system 10 based on the prior art, which includes a first hearing instrument 11 and a second hearing instrument 12. In particular, the hearing instruments 11, 12 may each be provided by a hearing device ("in the narrower sense"). According to the conversation situation shown in FIG. 1*a*, the second person 2 is simultaneously an interlocutor 6 of the wearer 5. The third person 3 can be regarded as a source of interference 7 in connection with the conversation situation between the wearer 5 and his or her interlocutor 6.

A dynamic compression is normally applied to the input signals in hearing instruments in order to map the dynamic range that is fundamentally able to be resolved by the microphones of the hearing instruments (that is to say from the minimum registerable sound level through to overdrive) to a range that is acceptable and preferably agreeable to the wearer. The lower limit for this range is then preferably provided by the hearing threshold of the wearer, and the upper limit of the range is preferably provided by the discomfort threshold. This is intended in particular to ensure a respective optimum gain (or attenuation) for all possible or realistically foreseeable input levels at the microphones.

In the binaural hearing system 10 shown in FIG. 1*b*, the dynamic compression described is applied in the two hearing instruments 11, 12 independently of one another, i.e. for each of the two hearing instruments 11, 12 an AGC ascertains a respective optimum gain factor for the associated input signal. This gain factor is normally different for the two hearing instruments 11, 12, since e.g. a higher sound level is recorded at the second hearing instrument 12, which is worn on the right ear of the wearer 5 in the present case, due to the source of interference 7, than at the first hearing instrument 11 (which is worn on the left ear of the wearer 5 in the present case, and therefore the source of interference 7 is shadowed by the head of the wearer 5).

A dynamic compression involves a higher sound level being assigned a lower gain factor for the most part than a lower sound level, the rule of assignment being provided for example on the basis of a compression characteristic curve (which describes the input level/output level relationship). For the conversation situation shown in FIG. 1*a* or 1*b*, this means that the gain factor that is ascertained in the first hearing instrument 11 as a first instantaneous gain parameter G1 for application to the input signal there (or to the input signals there when there are multiple) is greater than a second instantaneous gain parameter G2 ascertained in the second hearing instrument 12 for application there.

Due to the different gain for the input signals of the two hearing instruments 11, 12 as a result of the instantaneous gain parameters G1, G2, the conversation contributions of the interlocutor 6 are thus also amplified to different degrees in the two hearing instruments 11, 12, and accordingly also reproduced with different loudnesses for the wearer 5. This results in the wearer perceiving the "left-hand" contributions of the interlocutor 6 (which are recorded and processed by the first hearing instrument 11) to be louder due to G1>G2, than the "right-hand" contributions (which are recorded and processed by the second hearing instrument 12).

However, during the corresponding reproduction of the input signals of the hearing instruments 11, 12, this distorts the interaural level differences that are used by the hearing system to locate sound sources. This can also distort location, i.e. the wearer may acoustically perceive a sound source to be at a different location in the room than the actual position of the sound source.

Thus, in the present example shown in FIG. 1*b*, if the source of interference 7 delivers a loud noise, the dynamic compression due to the increased sound level lowers the second instantaneous gain factor G2 (in comparison with when the source of interference 7 is silent), that is to say that the G1>G2 case described above arises. However, since the interlocutor 6 is in the frontal direction 14 in relation to the wearer 5, and therefore his or her conversation contributions arrive at the wearer 5 with the same loudness, these conversation contributions are reproduced more loudly by the first hearing instrument 11, which is worn on the left by the wearer 5, than by the second hearing instrument 12, which is worn on the right. The perception of the wearer 5 is that this "artificial" level difference due to the different gain is felt as a shadowing effect and therefore as an interaural level difference, which means that the interlocutor 6 is no longer "heard" in the frontal direction 14 (that is to say perceived there), but rather in a direction 15 that is rotated slightly to the left from the frontal direction 14. This is illustrated diagrammatically in FIG. 1*b* on the basis of a graphical shift of the interlocutor 6 (see broad arrow) in the direction 15.

The different volumes due to the different instantaneous gain parameters G1>G2 can also have the same effect on other sound sources in the surroundings of the wearer 5. This also applies to the source of interference 7 in particular. In realistic situations, such a source of interference may also be provided by a danger to the wearer 5 (e.g. by an approaching vehicle in road traffic), which is why spatially distorted perception is also serious for safety reasons.

Figure 2:
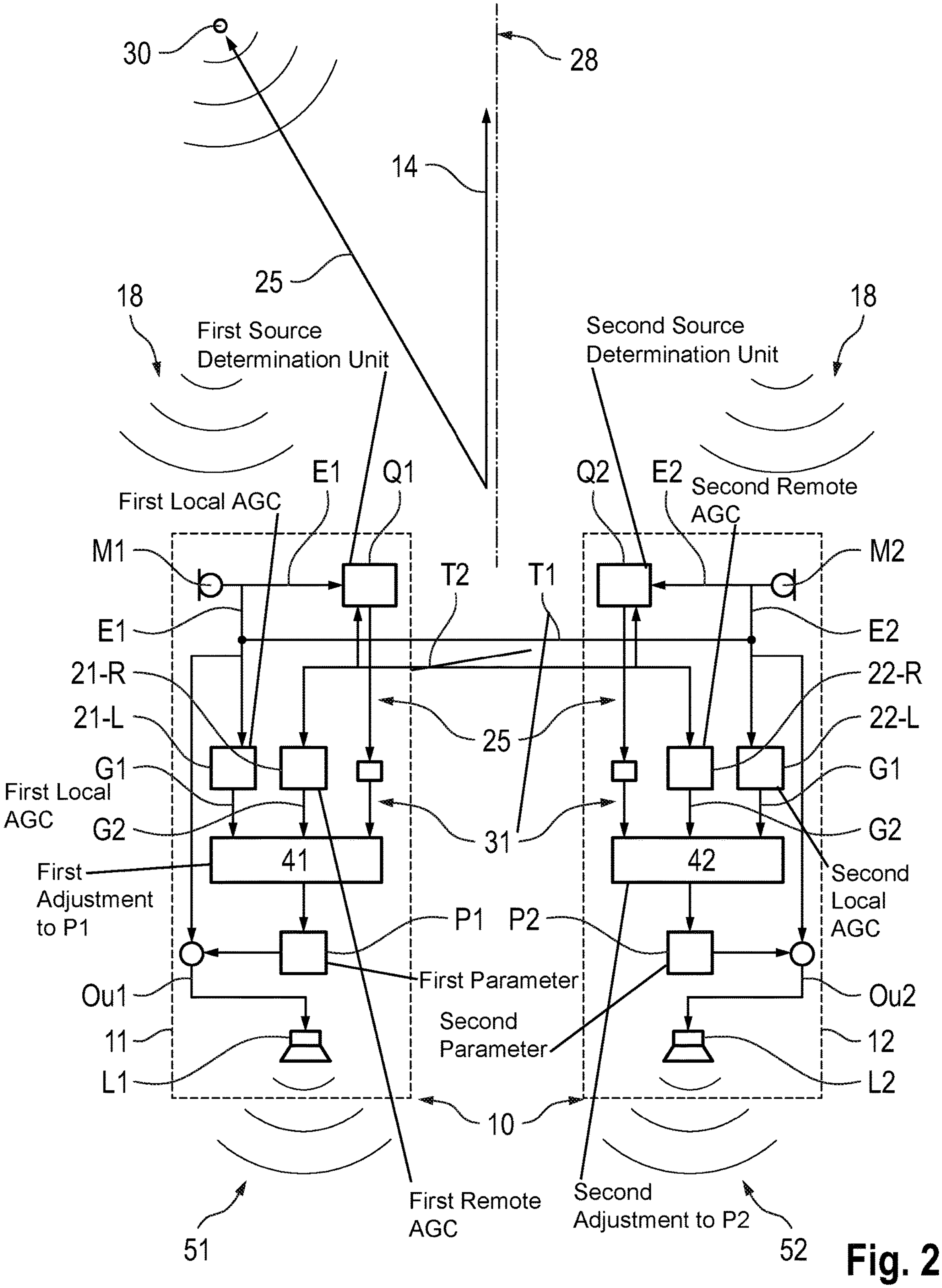
FIG. 2 is a block diagram showing the flow of a method for a binaural hearing system for improving spatial auditory perception.

In order to overcome the problem described on the basis of FIG. 1*b*, a method is provided for the binaural hearing system 10, the flow of which is shown in a block diagram on the basis of FIG. 2. The first hearing instrument 11 has an electroacoustic first input transducer M1 that is configured to generate a first input signal E1 from ambient sound 18, and which is provided by a microphone in the present case. The first hearing instrument 11 can also have a further input transducer (not shown) that is used to generate a further input signal from ambient sound 18, with the result that a directional processing of the local input signals can be performed in the hearing instrument 11.

The second hearing instrument 12 has an electroacoustic second input transducer M2 that is configured to generate a second input signal E2 from the ambient sound 18, and which is likewise provided by a microphone in the present case. The second hearing instrument 12 can also have a further input transducer (not shown) for a local directional processing in this case.

The first input signal E1 is used to generate a first transmission signal T1, which is transmitted from the first hearing instrument 11 to the second hearing instrument 12. The first transmission signal can be generated e.g. from a frequency range of contiguous frequency bands of the first input signal E1 in this instance. In the aforementioned case of a directional processing of two input signals in the first hearing instrument 11, the first transmission signal may also be provided by the resultant directional signal (or frequency bands thereof). The first transmission signal T1 may also be provided directly by the complete first input signal E1, however. Analogously to this, the second input signal E2 is used to generate a second transmission signal T2, which is transmitted from the second hearing instrument 12 to the first hearing instrument 11.

In the first hearing instrument, the first input signal E1 is used by a first local AGC 21-L, frequency band by frequency band, to ascertain a first instantaneous gain parameter G1 for the first input signal E1. This can preferably be ascertained in such a way that the first instantaneous gain parameter G1 attains an optimum gain, with respect to the dynamic range of the hearing instrument 11 and the hearing of the wearer 5, for the ambient sound 18 represented in the first input signal E1. Similarly, a first remote AGC 21-R in the first hearing instrument 11 uses the second transmission signal T2, frequency band by frequency band, to locally ascertain a second instantaneous gain parameter G2 for the second input signal E2 according to the same rules as the first instantaneous gain parameter G1 on the basis of the first input signal E1. The second instantaneous gain parameter G2 therefore forms the optimum gain for the second input signal E2 in the respective frequency band with respect to the dynamic range and the hearing capacity of the wearer 5.

It should be noted in this case that, in the present example, the second input signal E2 is identical to the second transmission signal T2 in the frequency bands in question (that is to say in those in which T2 is different than zero anyway). In the case of two input signals per hearing instrument, each locally preprocessed to produce corresponding directional signals, which is not shown, the directional signals, which are each generated locally, preferably replace the two input signals E1, E2. This means in particular that the instantaneous gain parameters G1, G2 are preferably generated from the applicable directional signals frequency band by frequency band (the respective directional signal, if necessary limited to a few frequency bands thereof, in particular also being used as a transmission signal).

Analogously, in the second hearing instrument 12, a second local AGC 22-L uses the second input signal E2 to ascertain the second instantaneous gain parameter G2 and a second remote AGC 22-R uses the first transmission signal T1 to ascertain the first instantaneous gain parameter G1, frequency band by frequency band. Due to the signal components with identical frequency bands that are used in each of the two hearing instruments 11, 12 to ascertain the first or second instantaneous gain parameter G1, G2, and due to the identical algorithms in the local first AGC 21-L and the remote second AGC 22-R (and in the remote first AGC 21-R and the local second AGC 22-L), the respectively ascertained first instantaneous gain parameters G1 in the two hearing instruments 11, 12 are thus identical to one another (and the respectively ascertained second instantaneous gain parameters G2 are identical to one another).

Furthermore, the first input signal E1 and the second transmission signal T2 are now used in a first source determination unit Q1 of the first hearing instrument 11, frequency band by frequency band, to at least approximately determine a direction 25 of a sound source 30 in the ambient sound 18. This approximate determination can ascertain e.g. a polar angle (if applicable to within an accuracy of 5°, 10° or the like) of the sound source relative to the frontal direction 14, or can ascertain just a half-area relative to a plane of symmetry 28 of the binaural hearing system 10 that contains the frontal direction 14, in which the sound source 30 is located. This half-area in question will be referred to as the focus half-area 31 in this case. Analogously thereto, the at least approximate direction 25 is also ascertained, frequency band by frequency band, in a second source determination unit Q2 of the second hearing instrument 12 on the basis of the second input signal E2 and the first transmission signal T1. Since the same signal components in the frequency bands are used for this purpose in each of the first and second hearing instruments 11, 12 (i.e. the respective input signal E1 or E2 is identical to its transmission signal T1 or T2 in the frequency bands used), the identical direction 25 is ascertained in the two source determination units Q1, Q2. If two input signals, each locally preprocessed to produce corresponding directional signals, are present in each hearing instrument 11, 12, which is not shown, the directional signals for the frequency bands are preferably supplied to each of the first and second source determination units Q1, Q2.

The direction 25 is used in each of the two hearing instruments 11, 12 to ascertain the focus half-area 31 in which the sound source 30 is located (if this has not already been done by the approximate determination of the direction 25), and, as a result of this, the half-area opposite the focus half-area 31, which will be referred to as the background half-area 32 in this case.

The first and second instantaneous gain parameters G1, G2 and the knowledge of the focus half-area 31 are now used in the first hearing instrument 11 to make a first adjustment 41 to a first parameter P1 of the AGC that is used for the signal processing locally in the first hearing instrument 11 (i.e. in the present exemplary embodiment a "remote" parameter of the second hearing instrument 12 is not adjusted in the first hearing instrument 11). Additionally or alternatively thereto, a second adjustment 42 to a second parameter P2 of the AGC that is used for the signal processing locally in the first hearing instrument 12 is made in the second hearing instrument 12.

In the present case, the first parameter P1 is provided by the first instantaneous gain parameter G1, and the second parameter P2 is provided by the second instantaneous gain parameter G2. If for example G1<G2 (if e.g. the sound source 30 in the focus half-area 31, due to shadowing effects, results in a higher sound level than in the background half-area 32, and there is also no excessively loud source of interference there), then for example the adjustment can take place in the second adjustment 42 simply using the value of the first instantaneous gain parameter G1 for the second parameter P2, with the result that the gain for the input signals E1, E2 is the same in both hearing instruments 11, 12. Such lowering merely attenuates additional background noise in the background half-area 32. If, conversely, G1>G2 (e.g. due to a loud source of interference in the background half-area 32 given a simultaneous useful signal from the sound source 30), then adaptive alignment of the parameters P1, P2 (that is to say of the two instantaneous gain parameters G1, G2) can be performed on the basis of additional voice recognition (not shown) for the input signals E1, E2 (or the transmission signals T1, T2). In short signal portions (for example frames, or other time bins of suitable length) containing voice components, the adjustment may be interrupted in order to prevent the voice signal from being incomprehensible as a result of G2 being raised (amplification of the background noise) or G1 (and thus the voice signal) being lowered. The adjustment (e.g. by aligning the instantaneous gain parameters G1, G2 for the values of the parameters P1, P2) is then restricted to the cases in which there is no voice signal.

Other, previously described, types of adjustments—in particular of both parameters P1 and P2 simultaneously—can also be carried out in this case.

The first input signal E1 is then processed further in the first hearing instrument 11 using the appropriately adjusted first parameter P1 to produce a first output signal Ou1, and the second input signal E2 is processed further in the second hearing instrument 12 using the appropriately adjusted second parameter P2 to produce a second output signal Ou2 (wherein, as mentioned, the adjustment may have a nontrivial effect only on one of the two parameters). The two output signals Out, Ou2 can then also be subjected to further signal processing steps, not shown in more detail (e.g. additional rejection of noise and/or acoustic feedback or the like), and are subsequently each converted by an electroacoustic first or second output transducer L1 or L2 into a first or second output sound signal 51 or 52, respectively.

Although the invention has been illustrated and described more thoroughly in detail by way of the preferred exemplary embodiment, the invention is not limited by the examples disclosed and other variations can be derived therefrom by a person skilled in the art without departing from the scope of protection of the invention.

The following is a summary list of reference numerals and the corresponding structure used in the above description of the invention.

LIST OF REFERENCE SIGNS

1 first person
2 second person
3 third person
5 wearer (of the binaural hearing system)
6 interlocutor
7 source of interference
10 binaural hearing system
11 first hearing instrument
12 second hearing instrument
14 frontal direction
15 direction
18 ambient sound
21-U-R first local or remote AGC
22-L/-R second local or remote AGC
25 direction (of the sound source)
28 plane of symmetry
30 sound source
31 focus half-area
32 background half-area
41 first adjustment
42 second adjustment
51 first output sound signal
52 second output sound signal
E1, E2 first and second input signals
G1, G2 first and second instantaneous gain parameters
L1, L2 (electroacoustic) first and second output transducers
M1, M2 (electroacoustic) first and second input transducers
Ou1, Ou2 first and second output signals
P1, P2 first and second parameters (of an AGC)
Q1, Q2 first and second source determination units
T1, T2 first and second transmission signals

The invention claimed is:

1. A method for operating a binaural hearing system, the method comprising:
- providing a first hearing instrument and a second hearing instrument;
- using an electroacoustic first input transducer of the first hearing instrument to generate a first input signal from ambient sound, and using an electroacoustic second input transducer of the second hearing instrument to generate a second input signal from ambient sound;
- using the first input signal to ascertain a first instantaneous gain parameter, and using the second input signal to ascertain a second instantaneous gain parameter;
- adjusting at least one of a first parameter of an automatic gain control for the first input signal or a second parameter of an automatic gain control for the second input signal, the adjustment resulting in a difference between the first and the second instantaneous gain parameters being decreased;
- performing a signal processing for the first or second input signal using the adjusted first or second parameter of the automatic gain control in the first or second hearing instrument;
- using the first input signal and the second input signal to at least approximately determine a direction of a sound source relating to the ambient sound;
- additionally basing the adjustment to the first or second parameter of the automatic gain control on the ascertained direction of the sound source;
- carrying out the approximate determination of the direction of the sound source by ascertaining a focus half-area containing the sound source and a background half-area being remote from the focus half-area, the focus half-area and the background half-area being defined relative to a plane of symmetry of the binaural hearing system; and carrying out the adjustment to the first or second parameter of the automatic gain control by also using the first or second instantaneous gain parameter relating to the focus half-area, or a signal level in the focus half-area.

2. The method according to claim 1, which further comprises adjusting the first or second instantaneous gain parameter as the first or second parameter of the automatic gain control.

3. The method according to claim 1, which further comprises adjusting at least one of a compression ratio or a knee of a compression characteristic curve or an attack time or a release time of a compression, as the first or second parameter of the automatic gain control.

4. The method according to claim 1, which further comprises making the adjustment to the first or second parameter of the automatic gain control to a greater degree the closer the ascertained direction of the sound source is to a frontal direction of the binaural hearing system.

5. The method according to claim 1, which further comprises carrying out the method frequency band by frequency band.

6. A binaural hearing system comprising:

a first hearing instrument and a second hearing instrument;

the binaural hearing system configured to carry out the method according to claim 1.

7. A method for operating a binaural hearing system, the method comprising:

providing a first hearing instrument and a second hearing instrument;

using an electroacoustic first input transducer of the first hearing instrument to generate a first input signal from ambient sound, and using an electroacoustic second input transducer of the second hearing instrument to generate a second input signal from ambient sound;

using the first input signal to ascertain a first instantaneous gain parameter, and using the second input signal to ascertain a second instantaneous gain parameter;

adjusting at least one of a first parameter of an automatic gain control for the first input signal or a second parameter of an automatic gain control for the second input signal, the adjustment resulting in a difference between the first and the second instantaneous gain parameters being decreased;

performing a signal processing for the first or second input signal using the adjusted first or second parameter of the automatic gain control in the first or second hearing instrument;

carrying out the adjustment to the first or second parameter of the automatic gain control by ascertaining at least one of a first correction parameter or a second correction parameter; and forming an adjusted first or second parameter based on a respective convex combination of the first parameter with the first correction parameter or the second parameter with the second correction parameter.

8. The method according to claim 7, which further comprises adjusting the first or second instantaneous gain parameter as the first or second parameter of the automatic gain control.

9. The method according to claim 7, which further comprises adjusting at least one of a compression ratio or a knee of a compression characteristic curve or an attack time or a release time of a compression, as the first or second parameter of the automatic gain control.

10. The method according to claim 7, which further comprises carrying out the method frequency band by frequency band.

11. A binaural hearing system comprising:

a first hearing instrument and a second hearing instrument;

the binaural hearing system configured to carry out the method according to claim 7.

12. A method for operating a binaural hearing system, the method comprising:

providing a first hearing instrument and a second hearing instrument;

using an electroacoustic first input transducer of the first hearing instrument to generate a first input signal from ambient sound, and using an electroacoustic second input transducer of the second hearing instrument to generate a second input signal from ambient sound;

using the first input signal to ascertain a first instantaneous gain parameter, and using the second input signal to ascertain a second instantaneous gain parameter;

adjusting at least one of a first parameter of an automatic gain control for the first input signal or a second parameter of an automatic gain control for the second input signal, the adjustment resulting in a difference between the first and the second instantaneous gain parameters being decreased;

performing a signal processing for the first or second input signal using the adjusted first or second parameter of the automatic gain control in the first or second hearing instrument;

transmitting the first input signal, or a first transmission signal derived from the first input signal, from the first hearing instrument to the second hearing instrument;

ascertaining the first and the second instantaneous gain parameters locally in the second hearing instrument; and taking the first and the second instantaneous gain parameters as a basis for adjusting the second parameter of the automatic gain control for the signal processing of the second input signal in the second hearing instrument.

13. The method according to claim 12, which further comprises carrying out the local ascertainment of the first and the second instantaneous gain parameters in the second hearing instrument by using a respective specifically dedicated hardwired circuit.

14. The method according to claim 13, which further comprises carrying out the method frequency band by frequency band, and transmitting only lower frequency bands of the first input signal to the second hearing instrument as the first transmission signal.

15. The method according to claim 12, which further comprises carrying out the method frequency band by frequency band, and transmitting only lower frequency bands of the first input signal to the second hearing instrument as the first transmission signal.

16. The method according to claim 12, which further comprises adjusting the first or second instantaneous gain parameter as the first or second parameter of the automatic gain control.

17. The method according to claim 12, which further comprises adjusting at least one of a compression ratio or a knee of a compression characteristic curve or an attack time or a release time of a compression, as the first or second parameter of the automatic gain control.

18. The method according to claim 12, which further comprises carrying out the method frequency band by frequency band.

19. A binaural hearing system comprising:

a first hearing instrument and a second hearing instrument;

the binaural hearing system configured to carry out the method according to claim 12.

* * * * *